Aug. 22, 1961  M. R. FRAZIER  2,997,156
CONVEYOR SYSTEM
Filed Nov. 10, 1959  3 Sheets-Sheet 3
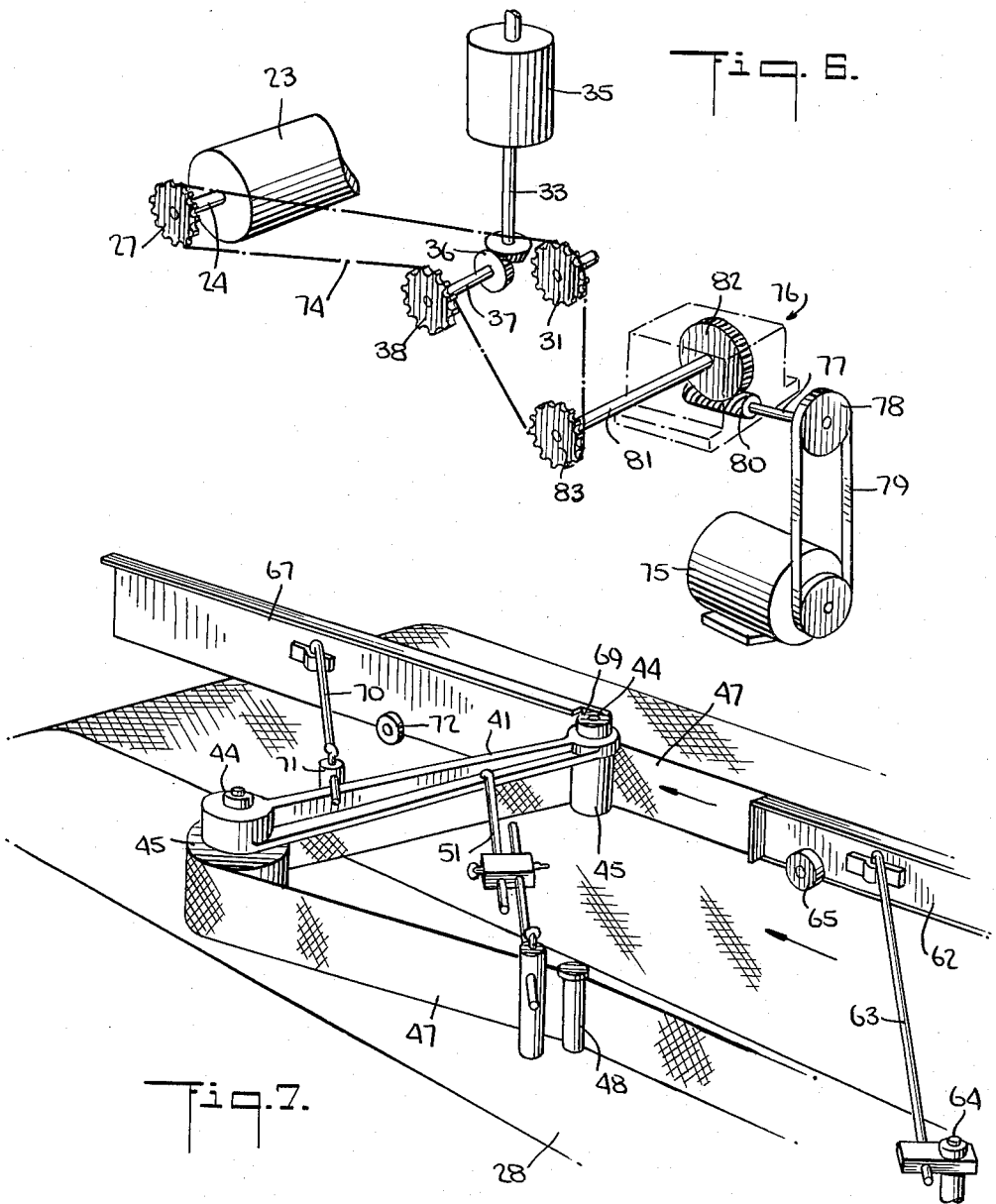
INVENTOR:
MARION ROBERT FRAZIER
BY
Frederick Breitenfeld
ATTORNEY

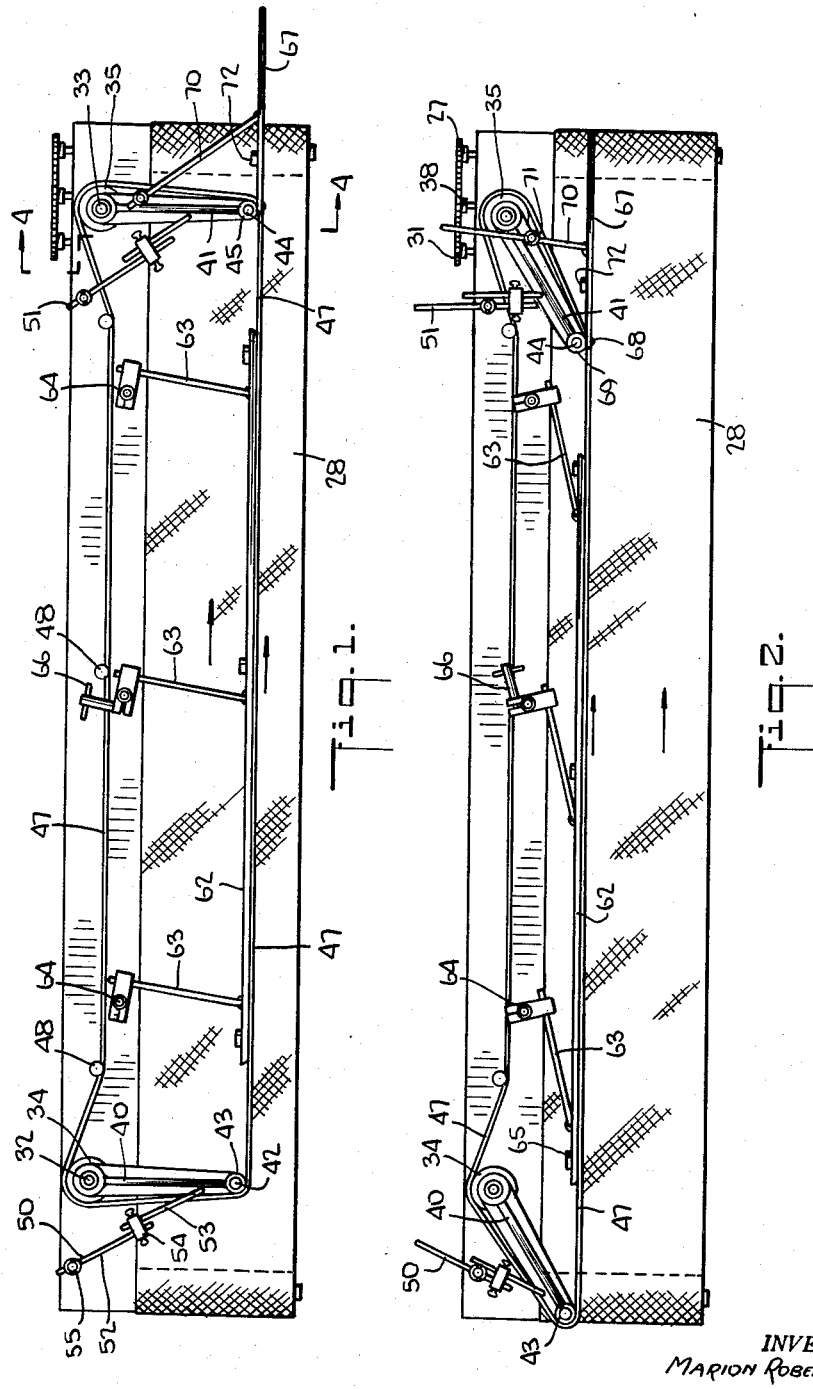

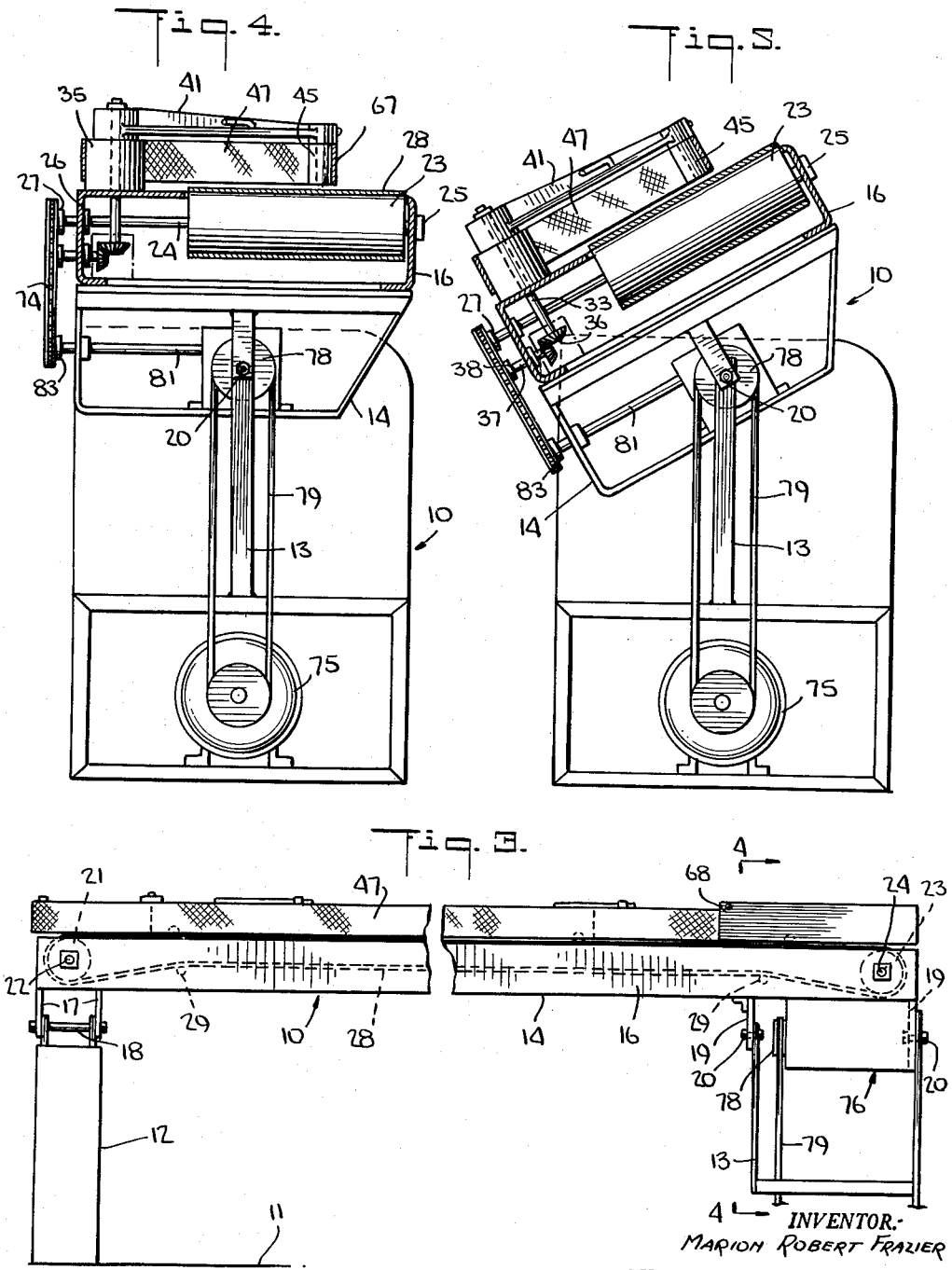

United States Patent Office 2,997,156
Patented Aug. 22, 1961

2,997,156
CONVEYOR SYSTEM
Marion R. Frazier, 25 Morningside Circle,
Little Falls, N.J.
Filed Nov. 10, 1959, Ser. No. 852,096
11 Claims. (Cl. 198—165)

This invention relates generally to conveyors, and has particular reference to a conveyor system provided with features of adjustability which make it possible to support articles of varying sizes and at different angles to the horizontal.

While the conveyor system was primarily developed for use in the packaging industry, for transportation of packaged articles to and past a sealing station, many phases of the invention have far wider applicability, as will be readily understood.

It is a general object of the invention to provide an improved conveyor system in which articles deposited upon a main article-supporting conveyor belt may be accurately maintained in a predetermined lateral disposition. This is important, for example, in conveying a succession of plastic bags to a sealing apparatus intended to engage and act upon the mouths of the bags in a predetermined manner.

A characterizing feature of this invention resides in the cooperative mounting of a second conveyor belt in adjacent relation to the main belt, the second belt having a working run longitudinally aligned with, and located directly over, the main conveyor and at a dihedral angle thereto. The working run of the upper conveyor is thus adapted to lend lateral support to the articles being conveyed, and by providing means for accurately advancing both conveyor belts at exactly the same speed, the articles are supported and transported in an accurate manner involving no relative movement between the conveyed articles and either of the belts which engage them.

A basic objective of the invention is to provide for the supporting and activation of the cooperating conveyor belts in such a manner that they may be readily adjusted in various ways, to accommodate articles of varying size and nature. One of the features of the invention lies in the ability to vary the lateral disposition of the working run of the upper conveyor. Another feature of the invention resides in a supporting structure which readily permits the entire conveyor system to be tilted at selected angles without disturbing or affecting the power transmission to the belts, nor the adjustment of the upper conveyor relative to the main conveyor.

It is a more particular object of the invention to achieve these advantages in a manner which is structurally and mechanically of relatively simple and inexpensive character, the various adjustments being readily and quickly available without calling for any unusual skill on the part of the operator.

A characterizing feature of novelty of the improved conveyor system lies in the support of the upper conveyor upon four rollers positioned to define the four angles of a parallelogram; and in providing a means whereby the angularity of the parallelogram may be readily varied. One side of the parallelogram constitutes the working run of the conveyor, and the adjustability of the parallelogram permits this working run to be shifted without disturbing the basic support of the belt, its length, or the mechanism which drives it.

One way of achieving these general objectives and advantages is exemplified in the accompanying drawings, in which—

FIG. 1 is a top plan view showing a conveyor system of the present invention in one position of its adjustment;

FIG. 2 is a top plan view similar to FIG. 1, showing another adjustment position;

FIG. 3 is a front elevational view of the conveyor system of FIG. 2;

FIG. 4 is a vertical sectional view taken substantially along the line 4—4 of FIG. 1;

FIG. 5 is a view similar to FIG. 4, showing the entire conveyor system in a tilted position;

FIG. 6 is a diagrammatic, perspective view illustrating the power transmission system; and FIG. 7 is a rear fragmentary perspective view showing a part of the conveyor enlarged for greater detail.

Referring now more particularly to the drawings and specifically to FIGS. 3, 4 and 5, the conveyor assembly includes a supporting structure, generally designated 10 adapted to rest on a ground surface 11. The supporting structure includes a lower or base part constituted of longitudinally spaced pedestals or legs 12 and 13, and an upper part 14. The upper part includes a horizontal frame or housing 16 extending longitudinally between the spaced pedestals 12 and 13. The housing 16 is provided on its underside, adjacent to its receiving end (the left hand end as seen in FIG. 3) with a pair of spaced, depending lugs or ears 17, connected to the upper end of pedestal 12 by a horizontal, longitudinal extending rod or bolt 18. Similarly depending from the underside of the housing 16 adjacent to its discharge end are a pair of lugs or ears 19 which are connected to the upper end of pedestal 13 by a pair of rods or bolts 20. The bolts 20 are in horizontal alignment with each other and with the bolt 18. By this means, the upper supporting structure 14 is mounted on the pedestals 12 and 13 of the lower part of the supporting structure for angular or tilting movement about the horizontal axis of the aligned bolts 18 and 20. The upper part 14 is adapted to be fixed in any selected position of its tilting adjustment by tightening of the bolts 18 and 20, or by other suitable means if desired.

Adjacent to each end of the housing 16, interiorly thereof, is a generally horizontal belt-supporting roller extending transversely across the housing. Thus, a roller 21 is mounted in the housing 16 at the receiving end for rotation abouts the axis of shaft 22; and a roller 23 is adjacent to the discharge end, mounted for rotation about the axis of a shaft 24 which is parallel to the shaft 22. Thus, the rollers 21 and 23 are arranged at opposite ends of the housing 16 and rotatable about generally parallel axes at right angles to the axis of bolts 18 and 20. The shaft 24 of roller 23 is seen in FIGS. 4 and 5 as being journaled at 25 and 26 in the front and rear walls of the housing. The shaft 24 extends rearward beyond the housing and is there provided with transmission means, such as a sprocket wheel 27.

An endless belt 28 extends about the rollers 21 and 23, having its runs or stretches spaced one above the other, with the upper stretch extending longitudinally along the upper side of the housing 16 for supporting engagement with articles being conveyed. Guide members or pulleys 29 may be mounted in the housing 16 for engagement with the lower stretch of the belt 28 to maintain it properly taut.

It will be observed that the belt 28 is spaced forward from the rear side of the housing 16. Extending upward from the housing 16, adjacent to its opposite ends and rearward of the main conveyor belt 28, are a pair of parallel shafts 32 and 33. The shafts 32 and 33 are rotatably mounted and located adjacent to the receiving and discharging ends of the housing 16 and arranged to lie with their axes perpendicular to the shafts 22 and 24. The shafts 32 and 33 are provided with pulleys 34 and 35. The pulley 34 is freely rotatable on its shaft, but the pulley 35, which is the belt-driving element, is keyed to its shaft 33. In FIGS. 4 and 5 it is seen that the shaft 33 extends downward into the housing 16 where it is operatively connected by bevel gearing 36 to a stub shaft 37 journaled in the rear wall of the housing and carrying a transmission element in the form of a sprocket wheel 38.

Referring to FIGS. 1 and 2, it will be noted that a pair of arms 40 and 41 are respectively pivoted to the shafts 32 and 33 and extend over the belt 28. The arm 40 is pivoted to the upper end of shaft 32, above the roller 34, and at its outer end it is provided with a depending pin 42, parallel to the shaft 32, and carrying a roller 43. Similarly, the arm 41 is pivoted at its inner end to the shaft 33 above the roller 35 and extends forward therefrom, being provided at its outer end with a depending pin 44 parallel to the shaft 33 and rotatably carrying a roller 45. The rollers 43 and 45 are freely rotatable about the axes of pins 42 and 44, respectively.

An endless belt 47 extends about the rollers 34, 35, 43 and 45. It is maintained properly taut by a plurality of pins or rollers 48 provided on the upper side of the housing 16 for engagement with the rear stretch of the belt between the rollers 34 and 35. In the properly taut condition of belt 47, the arms 40 and 41 are substantially parallel with each other.

In order to maintain the arms 40 and 41 parallel in any selected position of their swinging adjustment about the axes of shafts 32 and 33, adjustment struts or braces 50 and 51 are provided, each being connected to the housing 16 and to one of the arms. The adjustment strut 50 is illustrative of the construction preferred. It includes a pair of elongate members 52 and 53 extending side by side and adjustably connected together by a readily loosenable coupling 54. One end of the elongate member 52 is pivotally connected at 55 to the housing 16, while the outer end of the elongate member 53 is pivotally connected to the arm 40 at a point spaced from its pivot 32. Hence, by adjustment of the members 52 and 53 relative to each other, and securement thereof by the coupling 54, the arm 40 may be fixed in any selected position of its swinging adjustment about pivot 32. The arm 41 may similarly be fixed in any swinging position of adjustment about its pivot 33 by similar adjustment and securement of the strut or brace 51.

The rollers 34, 35, 43 and 45 are located at the corners of a parallelogram. The belt 47 extends around them, and its working run or stretch extends between the free ends of the arms 40 and 41. This stretch of the belt 47 is obviously at right angles to the upper stretch of the main conveyor belt 28, defining a dihedral angle admirably adapted to lend support to the articles to be conveyed. The angularity of the parallelogrammic figure defined by the four supporting rollers for the belt 47 may be varied, as indicated by a comparison of FIGS. 1 and 2. By adjustment of the arms 40 and 41, the forward stretch or working run of the belt 47 can be moved to any selected position laterally of the conveyor 28.

A backing member or plate 62 extends longitudinally along, and in facing engagement with, the inner side of the belt 47 between the rollers 43 and 45. The backing plate is carried on the ends of a plurality of brackets 63, which are each pivoted to the housing 16, as at 64, and pivotally connected to the backing plate. Thus, the backing plate is adjustable laterally of the conveyor 28, so as to maintain backing engagement with the working run of belt 47. Suitable means is provided for fixing the backing plate 62 in any selected position of its lateral adjustment, as by a screw element 66 at one of the pivots 64 for clamping one of the brackets 63 in the selected position. The backing plate 62 may be further provided with depending wheels or rollers 65 for rolling engagement with the belt 28.

Inherent in the swinging action of the arms 40 and 41 is a movement of the working stretch of belt 47 in a longitudinal direction. To compensate for this at the discharge end of the conveyor system, a special extension member or plate 67 is pivotally connected to the outer end of arm 41. More particularly, the extension plate 67 is secured, as by a fastener 68, to an annular bearing member 69 carried by and freely rotatable on the pin 44. The extension plate is in a plane parallel to the axis of pin 44, and extends from the outer end of arm 41 in the discharge direction of conveyor movement. A strut 70 is pivoted to the extension member 67 and to arm 41, and releasable securement means, such as a clamp 71, is provided on the arm 41 to slidably receive the elongate member and fixably position the extension member at any selected angle with respect to the arm. Also, a depending roller or wheel 72 may be carried by the extension member 67 for rolling engagement with the upper stretch of belt 28.

The extension plate 67 may be swung about the axis of pin 44, and fixed at any position of its swinging movement by strut 70, so as to lie in substantially coplanar or flush relation with the working run of belt 47, in any selected adjustment position of the arms 40 and 41.

An important feature of the conveyor system resides in the transmission means by which both conveyor belts are advanced at the same speed. At the same time, the transmission means must be of such a character that the tilting of the entire conveyor system (as indicated in FIGS. 4 and 5) may be readily accomplished. The manner in which these results may be achieved is shown in FIG. 6.

Movement of belt 28 is effected by driven rotation of roller 23 and free rotation of roller 21. Also, movement of belt 47 is effected by driven rotation of roller 35, and free rotation of rollers 34, 43 and 45. Power to roller 23 is transmitted to shaft 24 through sprocket wheel 27 and a sprocket chain 74. Power to roller 35 is transmitted through shaft 33, bevel gearing 36, stub shaft 37, sprocket wheel 38, and sprocket chain 74. Hence, sprocket chain 74 is a common power transmission element to both conveyors 28 and 47. A source of power may be provided in the form of an electric motor 75, mounted in the pedestal 13. By means of a belt 79 or its equivalent, the motor drives a pulley 78 mounted on a drive shaft 77. This shaft carries a worm 80, in driving engagement with a worm wheel 82 which controls the rotation of the driven shaft 81. In any desired or approximate manner, a reduction gearing designated 76 may be interposed between the drive shaft 77 and the driven shaft 81.

Of primary importance is the fact that the drive shaft 77 is aligned with the tilt axis represented by the aligned pivots 18 and 20. In this way, the upper part of the supporting structure, and all the conveyor elements carried by it and driven by the drive shaft 77, may be freely tilted into any desired angular position without affecting the driving linkage, whatever its nature may be, between the motor 75 and the drive shaft 77.

The driven shaft 81 carries a sprocket wheel 83 in driving engagement with the sprocket chain 74. An idler sprocket wheel 31 is mounted on the housing 16 to afford appropriate support for the chain 74.

By proper section of sprocket wheel and pulley sizes, and of bevel gears 36, the linear speeds of conveyor belts 28 and 47 are made equal.

In operation, the conveyors 28 and 47 are driven to move their working runs in the directions of the arrows in FIGS. 1 and 2. As the upper stretch of the main load-carrying conveyor 28 and the working run of the auxiliary or upper conveyor 47 move at the same linear speed, it is apparent that an article supported on the upper stretch of the main conveyor may be statically or relatively immovably engaged by the working run of the upper conveyor and thus located laterally of the main conveyor throughout its movement therealong according to the selected position of adjustment of the auxiliary conveyor. This is especially advantageous in the conveying and processing of bagged articles wherein it is desirable to perform an operation on the mouth of the bag, say to seal and or label the bag mouth. It may be necessary, for example, that the mouth of the bag extend forwardly beyond the load-carrying conveyor by a fixed amount, and proper positioning can be maintained by adjustment of the auxiliary or upper conveyor corresponding to the particular size of the bag. Also, it is sometimes desirable, for better support of articles or to raise or lower the forwardly extending bag mouth, to incline the bag or article. This may be accomplished by the hereinbefore described tilting adjustment of the upper supporting structure 14. At the discharge end of the upper conveyor 47 the extension plate 67 may be conveniently adjusted, as described hereinbefore, to maintain substantial coplanarity with the working run of the conveyor and insure proper discharge of the conveyed articles.

From the foregoing it is seen that a conveyor assembly is provided which fully accomplishes its intended objects, and is well adapted to meet practical conditions of manufacture and use.

Although the present invention has been described in some detail by way of illustration and example for purposes of clarity of understanding, it is understood that changes and modifications may be made within the spirit of the invention without necessarily departing from the scope of the appended claims.

What is claimed is:

1. A conveyor system comprising a supporting structure, a lower conveyor mounted on said supporting structure and adapted to support articles being conveyed thereby, an upper conveyor mounted on said supporting structure and having a working run longitudinally aligned with and located directly over the lower conveyor at a dihedral angle thereto, said working run being adapted to lend lateral support to the articles being conveyed, transmission means connected to said conveyors for moving them at the same linear speed, whereby said working run of the upper conveyor remains in relatively static engagement with the conveyed articles, and means supporting said working run for lateral adjustment relative to the lower conveyor, said supporting means comprising four rollers so positioned that the upper conveyor extends around them along a parallelogrammic path, and means for adjusting said rollers to alter the angularity of the parallelogram.

2. A conveyor system as defined in claim 1, said last-named means comprising a pair of arms pivoted to the supporting structure on one side of said lower conveyor, each arm supporting a pair of said rollers.

3. A conveyor system as defined in claim 1, said last-named means comprising a pair of arms pivoted to the supporting structure on one side of said lower conveyor, each arm supporting a pair of said rollers, one at each end of the arm.

4. A conveyor system as defined in claim 1, said last-named means comprising a pair of arms pivoted to the supporting structure on one side of said lower conveyor, each arm supporting a pair of said rollers, one at each end of the arm, said arms being pivoted on axes coincident with two adjacent angles of said parallelogram.

5. A conveyor system according to claim 1, said upper conveyor comprising a pair of parallel arms mounted on said supporting structure on one side of said lower conveyor for pivotal movement in parallelism with each other, and an endless conveyor element trained about said arms in a closed polygonal configuration and supported on said arms for movement therewith, one side of said configuration defining said working run and being movable with said arms to effect said lateral adjustment of said working run.

6. A conveyor system according to claim 1, said upper conveyor comprising a pair of parallel arms mounted on said supporting structure on one side of said lower conveyor for pivotal movement in parallelism with each other, and an endless conveyor element trained about said arms in a closed polygonal configuration and supported on said arms for movement therewith, one side of said configuration defining said working run and being movable with said arms to effect said lateral adjustment of said working run, said pair of arms including a pair of swingable ends extending over said lower conveyor and swingable laterally and longitudinally thereof, said working run extending between said pair of swingable arm ends for adjusting movement therewith, an extension member carried by the swingable arm end at the discharge end of said working run, and means supporting said extension member for swinging adjustment about its adjacent swinging arm end, whereby said extension member is adapted to be aligned with said working run in any selected adjustment position of the latter.

7. A conveyor system as defined in claim 1, said supporting structure including a fixed base, and an upper part mounted on said base for swinging adjustment on a horizontal axis relative to said base, said lower and upper conveyors being mounted on said upper part of the supporting structure so that they and said upper part are swingable as a unit to vary the inclination of the conveyed articles.

8. A conveyor system as defined in claim 1, said supporting structure including a fixed base, and an upper part mounted on said base for swinging adjustment on a horizontal axis relative to said base, said lower and upper conveyors being mounted on said upper part of the supporting structure so that they and said upper part are swingable as a unit to vary the inclination of the conveyed articles; said transmission means being carried by said upper part for movement with the latter, said transmission means comprising a rotatable driving element coaxial with said horizontal axis, and a driven element which remains in driven engagement with said driving element in all positions of said upper part.

9. A conveyor system comprising a supporting structure, an endless-belt load-carrying conveyor mounted on said supporting structure for movement of its belt about parallel axes, and a load-locating conveyor extending longitudinally of and over said load-carrying conveyor for laterally locating articles on said load-carrying conveyor, said load-locating conveyor comprising a pair of generally parallel arms pivotally adjustably mounted on said supporting structure at one side of said load-carrying conveyor and extending over said load-carrying conveyor for pivotal swinging movement about parallel axes transverse of said first-mentioned parallel axes, an endless belt extending about both of said arms whereby the belt is adjustable laterally upon pivotal movement of said arms, a backing member located over said load-carrying conveyor between said arms and extending closely along the inner side of said load-locating belt in backing relation thereto, and a means mounting said backing member on said supporting structure for lateral adjustment to maintain said backing member in said backing relation.

10. A conveyor assembly according to claim 9, in combination with roller means carried by said backing member and depending therebelow for rolling engagement with said load-carrying conveyor.

11. A conveyor system according to claim 8, said drive element and driven element comprising a worm shaft and a worm wheel driven thereby.

References Cited in the file of this patent

UNITED STATES PATENTS

| 2,809,741 | Keileg | Oct. 15, 1957 |
| 2,810,469 | Sindzinski | Oct. 22, 1957 |

FOREIGN PATENTS

| 344,205 | Germany | Nov. 17, 1921 |
| 707,896 | Great Britain | Apr. 28, 1954 |
| 1,143,776 | France | Apr. 15, 1957 |